United States Patent
Seo (10) Patent No.: US 10,579,261 B2
(45) Date of Patent: Mar. 3, 2020

(54) USER TERMINAL APPARATUS, METHOD FOR INPUTTING TEXT AND DISPLAYING AN INPUT MODE SIGN NEXT TO A TEXT INPUT CURSOR IN USER TERMINAL APPARATUS, AND COMPUTER-READABLE RECORDING MEDIUM

(71) Applicant: Samsung Electronics Co., Ltd., Suwon-si, Gyeonggi-do (KR)

(72) Inventor: Won-young Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/046,284

(22) Filed: Oct. 4, 2013

(65) Prior Publication Data

US 2014/0101618 A1 Apr. 10, 2014

(30) Foreign Application Priority Data

Oct. 5, 2012 (KR) ........................ 10-2012-0110921

(51) Int. Cl.
*G06F 3/0489* (2013.01)
*G06F 3/0481* (2013.01)

(52) U.S. Cl.
CPC ...... *G06F 3/04892* (2013.01); *G06F 3/04812* (2013.01); *G06F 3/04895* (2013.01)

(58) Field of Classification Search
CPC ............. G06F 3/04812; G06F 3/04892; G06F 3/04895; G06F 9/44; G06F 3/147; G06F 3/14
USPC ........................................................ 715/856
See application file for complete search history.

(56) References Cited

U.S. PATENT DOCUMENTS

| | | | | |
|---|---|---|---|---|
| 5,442,742 A | * | 8/1995 | Greyson ................. | G06F 17/24 345/157 |
| 5,657,050 A | * | 8/1997 | McCambridge .... | G06F 3/04812 715/856 |
| 6,014,616 A | | 1/2000 | Kim | |
| 6,411,283 B1 | * | 6/2002 | Murphy ................. | G06F 3/041 178/18.01 |
| 6,867,790 B1 | * | 3/2005 | Brooks ............... | G06F 3/04812 345/157 |
| 7,721,196 B2 | * | 5/2010 | Tilford .................... | G06F 17/24 715/236 |
| 8,069,029 B2 | * | 11/2011 | Scott ..................... | G06F 17/276 345/169 |
| 8,271,906 B1 | * | 9/2012 | Fong ........................ | G06F 3/14 345/157 |
| 2003/0100964 A1 | * | 5/2003 | Kluge .................. | G05B 19/042 700/83 |

(Continued)

FOREIGN PATENT DOCUMENTS

| | | |
|---|---|---|
| CN | 102033693 A | 4/2011 |
| EP | 2 306 287 A2 | 4/2011 |

(Continued)

OTHER PUBLICATIONS

Kota U.S. Appl. No. 61/595,912.*

(Continued)

*Primary Examiner* — Ryan F Pitaro
(74) *Attorney, Agent, or Firm* — Jefferson IP Law, LLP (57) ABSTRACT

An apparatus and a method for inputting a text in a user terminal apparatus are provided. The text inputting method includes detecting a text input mode set in the user terminal apparatus and displaying a sign corresponding to the detected text input mode near a text input cursor.

11 Claims, 10 Drawing Sheets

(56) References Cited

U.S. PATENT DOCUMENTS

| | | | |
|---|---|---|---|
| 2003/0206157 A1* | 11/2003 | Emerson | G06F 3/04895 345/168 |
| 2004/0036679 A1* | 2/2004 | Emerson | 345/168 |
| 2004/0174341 A1* | 9/2004 | Gershuni | G06F 3/021 345/168 |
| 2007/0294644 A1* | 12/2007 | Yost | G06F 3/04812 715/856 |
| 2008/0115072 A1 | 5/2008 | Lu | |
| 2009/0182901 A1 | 7/2009 | Callaghan et al. | |
| 2009/0327948 A1 | 12/2009 | Penttinen et al. | |
| 2011/0078636 A1* | 3/2011 | Jeon | G06F 3/0488 715/859 |
| 2011/0231427 A1* | 9/2011 | Nakano | G06F 3/0237 707/769 |
| 2011/0239112 A1* | 9/2011 | Nakano | G06F 3/0237 715/261 |
| 2011/0239153 A1* | 9/2011 | Carter | G06F 3/04812 715/784 |
| 2013/0203473 A1* | 8/2013 | Kota | 455/575.8 |
| 2018/0292969 A1* | 10/2018 | Dhawan | G06F 3/04812 |

FOREIGN PATENT DOCUMENTS

| | | |
|---|---|---|
| EP | 2 506 134 A2 | 10/2012 |
| JP | 1-180030 A | 7/1989 |
| JP | 4-000036 U | 1/1992 |
| JP | 9-34431 A | 2/1997 |
| JP | 9-153042 A | 6/1997 |
| JP | 2001-42996 A | 2/2001 |
| JP | 2001-242991 A | 9/2001 |
| KR | 2002-0004008 A | 1/2002 |
| KR | 10-2006-0062199 A | 6/2006 |
| KR | 10-2007-0016675 A | 2/2007 |
| KR | 10-2007-0031638 A | 3/2007 |
| KR | 10-2007-0117339 A | 12/2007 |
| KR | 10-2010-0038858 A | 4/2010 |
| KR | 10-2011-0026231 A | 3/2011 |

OTHER PUBLICATIONS

European Office Action dated Oct. 17, 2018; European Appln. No. 13 843 835.3-1221.

Australian Office Action dated Jul. 30, 2018; Australian Patent Appln. No. 2013325379.

Korean Office Action with English translation dated Feb. 20, 2019; Korean Appln. No. 10-2012-0110921.

Korean Office Action dated Aug. 30, 2019, issued in Korean Application No. 9-5-2019-062573054.

Korean Office Action dated Oct. 30, 2019, issued in Korean Application No. 9-5-2019-078928493.

\* cited by examiner

USER TERMINAL APPARATUS, METHOD FOR INPUTTING TEXT AND DISPLAYING AN INPUT MODE SIGN NEXT TO A TEXT INPUT CURSOR IN USER TERMINAL APPARATUS, AND COMPUTER-READABLE RECORDING MEDIUM

PRIORITY

This application claims the benefit under 35 U.S.C. § 119(a) of a Korean patent application filed in the Korean Intellectual Property Office on Oct. 5, 2012 and assigned Serial No. 10-2012-0110921, the entire disclosure of which is hereby incorporated by reference.

BACKGROUND OF THE INVENTION

1. Field of the Invention

The present invention relates to a user terminal apparatus and a method for inputting a text. More particularly, the present invention relates to a user terminal apparatus and a method for inputting a text while a current text input mode is displayed.

2. Description of the Related Art

In general, in order to input Korean and English text or characters in various application programs that use both Korean and English, a user should convert a mode to a Korean input mode or to an English input mode using a Korean/English conversion key, or convert a mode to an English capital letter mode using a Caps Lock key. Although the frequency of using the Korean/English conversion key and the Caps Lock key may be different depending on the type of application programs, it is very inconvenient for a user to use the Korean/English conversion key and the Caps Lock key whenever inputting an English word.

More particularly, as the Internet is frequently used, in many cases, a user needs to input a Korean text and an English text alternatively in order to input an Internet domain address and a search text in application programs such as a web browser program and a search program.

In this case, the user needs to identify whether the mode of a text input apparatus is in a Korean input mode or an English input mode and use the Korean/English conversion key appropriately. In addition, a user needs to identify whether the mode of a text input apparatus is in English upper case mode or an English lower case mode and use the Caps Lock key appropriately.

If a user performs an operation in different input modes, an input mistake may be recognized after the input operation has been completed and thus, the user needs to correct the pre-input contents, causing an inconvenience to the user.

Therefore, a need exists for an apparatus and method that provides a sign corresponding to a current text input mode along with a text input cursor.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a user terminal apparatus that provides a sign corresponding to a current text input mode along with a text input cursor, a method for inputting a text in a user terminal apparatus, and a computer-readable recording medium.

In accordance with an aspect of the present invention, a method for inputting a text in a user terminal apparatus is provided. The method includes detecting a text input mode set in the user terminal apparatus and displaying a sign corresponding to the detected text input mode near a text input cursor.

In an exemplary implementation, the text input mode may be a mode to be applied to a text to be displayed on a text input screen when a text input is performed.

In an exemplary implementation, the sign may include language information regarding a text to be displayed on a text input screen when a text input is performed.

In an exemplary implementation, the method may further include generating a combination cursor by positioning the sign near the text input cursor, and the displaying may include displaying the sign near the text input cursor by displaying the generated combination cursor on a location where a text is to be input.

In an exemplary implementation, the displaying may include changing and displaying a location of the sign near the text input cursor according to a display state of a text input screen.

In an exemplary implementation, the displaying may include, if a text input to the user terminal apparatus is not received for a predetermined time or the text input mode is changed, displaying the sign near the text input cursor.

In an exemplary implementation, the method may further include, if a predetermined time elapses from a time when the sign is displayed, deleting the sign and displaying only the text input cursor on a location where a text is to be input.

In an exemplary implementation, the method may further include receiving a text input, and the user terminal apparatus may be a smart phone, and the text input may be performed through a text input apparatus which is connected to the user terminal apparatus via a cable or wirelessly.

In an exemplary implementation, the text input mode may be set in the user terminal apparatus as a specific area and is selected in a text input apparatus which is connected to the user terminal apparatus via cable or wirelessly.

In an exemplary implementation, the sign may further include at least one of insert on/off information and Num-lock on/off information.

In accordance with another aspect of the present invention, a user terminal apparatus is provided. The apparatus includes a detector configured to detect a text input mode set in the user terminal apparatus and a controller configured to provide a sign corresponding to the detected text input mode near a text input cursor.

In an exemplary implementation, the text input mode may be a mode to be applied to a text to be displayed on a text input screen when a text input is performed.

In an exemplary implementation, the sign may include language information regarding a text to be displayed on a text input screen when a text input is performed.

In an exemplary implementation, the controller may be configured to generate a combination cursor by positioning the sign near the text input cursor and provide the sign near the text input cursor by providing the generated combination cursor on a location where a text is to be input.

In an exemplary implementation, the controller may be configured to change and display a location of the sign near the text input cursor according to a display state of a text input screen.

In an exemplary implementation, the controller, if a text input to the user terminal apparatus is not received for a predetermined time or the text input mode is changed, may be configured to provide the sign near the text input cursor.

In an exemplary implementation, the controller, if a predetermined time elapses from a time when the sign is displayed, may be configured to delete the sign and provide only the text input cursor on a location where a text is to be input.

In an exemplary implementation, the apparatus may further include a display unit configured to display a screen, and the controller may control the display unit to display a sign corresponding to the detected text input mode near a text input cursor.

In an exemplary implementation, the apparatus may further include an interface unit configured to receive a text input, and the user terminal apparatus may be a smart phone, and the text input may be performed through a text input apparatus which is connected through the interface unit via cable or wirelessly.

In accordance with another aspect of the present invention, a computer-readable recording medium having recorded thereon a program code for performing a method for inputting a text in a user terminal apparatus is provided. The method includes detecting a text input mode set in the user terminal apparatus and displaying a sign corresponding to the detected text input mode near a text input cursor.

According to various exemplary embodiments, a sign corresponding to a text input mode is displayed along with a text input cursor, and thus a user's typographical error may be prevented.

In addition, as a sign corresponding to a text input mode is displayed along with a text input cursor, efficiency for inputting a text may be enhanced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects of the present invention will be more apparent from the following description taken in conjunction with the accompanying drawings, in which:

FIGS. 6A to 8 are views illustrating a text input screen according to various exemplary embodiments of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Exemplary Embodiment

Figure 1:
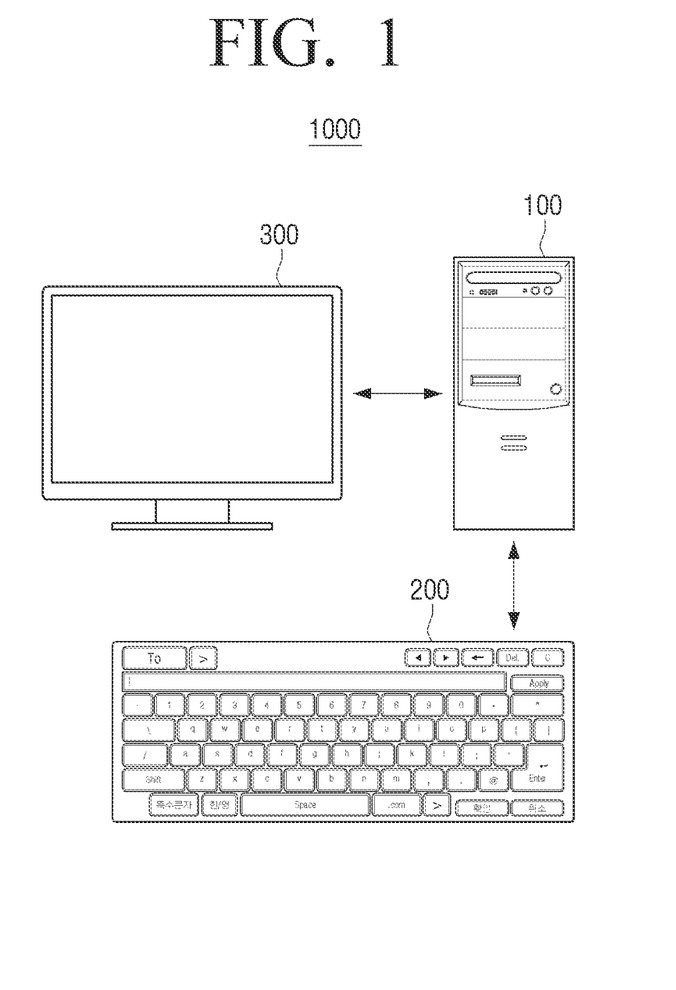
FIG. 1 is a view illustrating a text input system according to a first exemplary embodiment of the present invention.

FIG. 1 is a view illustrating a text input system according to a first exemplary embodiment of the present invention.

Referring to FIG. 1, a text input system 1000 comprises a user terminal apparatus 100, a text input apparatus 200, and a display apparatus 300. According to the first exemplary embodiment, the user terminal apparatus 100 may be realized as a desktop Personal Computer (PC), the text input apparatus 200 may be realized as a keyboard, and the display apparatus 300 may be realized as a monitor. That is, according to the first exemplary embodiment, the user terminal apparatus 100, the text input apparatus 200, and the display apparatus 300 may be realized as separate objects from one another.

Meanwhile, the user terminal apparatus 100 and the text input apparatus 200 may be connected using a wired connection such as a cable or using a wireless connection such as Bluetooth, Radio Frequency (RF), or Near Field Communication (NFC). In addition, the user terminal apparatus 100 and the display apparatus 300 may be connected via cable using a Digital Visual Interface (DVI) cable or a High-Definition Multimedia Interface (HDMI) cable, or may be connected wirelessly using a wireless adaptor.

The text input apparatus 200 may receive a text input or a text input mode setting from a user. More specifically, if a text input area of the text input apparatus 200 is selected by the user, the text input apparatus 200 may receive the user's text input. In addition, if a text input mode setting area of the text input apparatus 200 is selected by the user, the text input apparatus 200 may receive the user's text input mode setting.

Herein, if a text input is performed in the text input apparatus 200, the text input mode may be applied to a text to be displayed on a text input screen of the display apparatus 300. Such a text input mode may include at least one of a language mode (e.g., a Korean mode, an English mode, a Japanese mode, a Chinese mode, and so on), a Caps Lock mode, an Insert mode, a Numlock mode, and the like. Herein, the language mode, the Insert mode and the Numlock mode maybe set by selecting a specific area of the text input apparatus 200 which corresponds to each mode.

The text input apparatus 200 may transmit a signal corresponding to a received text input or a signal corresponding to a received text input mode setting to the user terminal apparatus 100.

The user terminal apparatus 100 may set a text input mode according to a signal corresponding to a received text input mode setting. In addition, the user terminal apparatus 100 may detect a text input mode which is set in the user terminal apparatus 100. Further, the user terminal apparatus 100 may provide a sign corresponding to the detected text input mode near a text input cursor.

Herein, if a text input is performed through the text input apparatus 200, the sign may include language information of a text to be displayed on a text input screen of the display apparatus 300. In addition, the sign may further include at least one of insert on/off information and Numlock on/off information.

If a text input is performed through the text input apparatus 200, the text input cursor informs that an input text may be displayed immediately, and may be represented as 'l' which is displayed at a location where a text will be input. That is, the text input cursor may inform that it is ready to receive an input of a text.

The user terminal apparatus 100 may control the display apparatus 300 to display a text corresponding to a received text input signal.

The display apparatus 300 may display a screen under the control of the user terminal apparatus 100. More particularly, the display apparatus 300 may display a text input screen including a text input cursor, a sign corresponding to a text input mode, and the like, under the control of the user terminal apparatus 100.

Second Exemplary Embodiment

Figure 2:
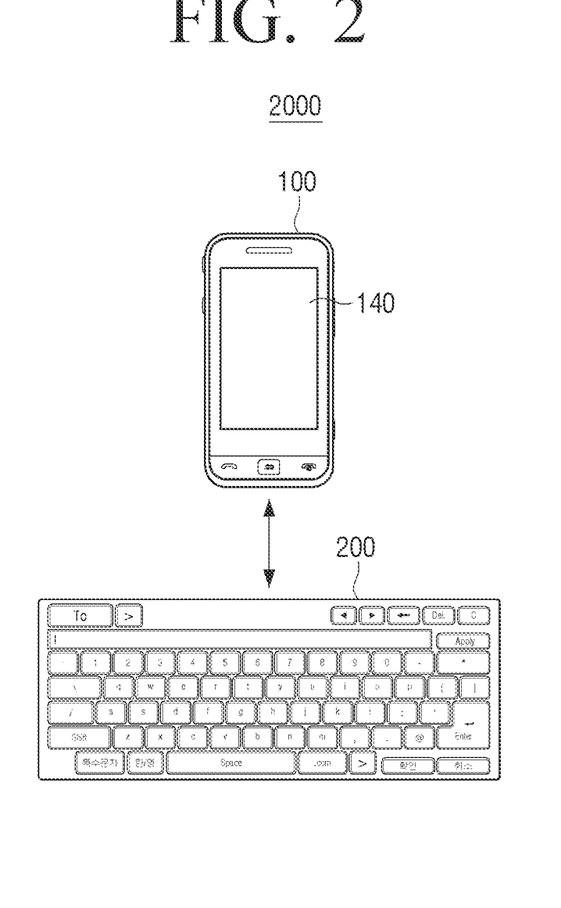
FIG. 2 is a view illustrating a text input system according to a second exemplary embodiment of the present invention.

FIG. 2 is a view illustrating a text input system according to a second exemplary embodiment of the present invention.

Referring to FIG. 2, a text input system 2000 comprises the user terminal apparatus 100 and the text input apparatus 200. According to the second exemplary embodiment, the user terminal apparatus 100 may be realized as a mobile apparatus such as a smart phone, a Personal Digital Assistants (PDA), a Portable Multimedia Player (PMP), a tablet Personal Computer (PC), and the like, and the text input apparatus 200 may be realized as a keyboard.

The user terminal apparatus 100 and the text input apparatus 200 may be connected via a wired connection such as a cable, or a wireless connection such as Bluetooth, Radio Frequency (RF), or Near Field Communication (NFC).

Herein, a text input system according to the second exemplary embodiment may operate in substantially the same way as the text input system according to the first exemplary embodiment except that the operation which is performed as the text input system according to the second exemplary embodiment further includes a display unit 140 for displaying a screen. Therefore, detailed operations of the text input system according to the second exemplary embodiment will not be provided as they are already described above.

Third Exemplary Embodiment

Figure 3:
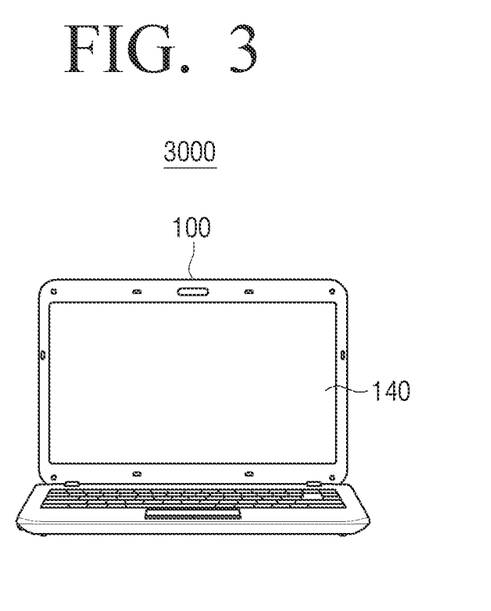
FIG. 3 is a view illustrating a text input system according to a third exemplary embodiment of the present invention.

FIG. 3 is a view illustrating a text input system according to a third exemplary embodiment of the present invention.

Referring to FIG. 3, a text input system 3000 comprises the user terminal apparatus 100. According to the third exemplary embodiment, the user terminal apparatus 100 may be realized as a notebook PC.

Herein, the text input system according to the third exemplary embodiment may operate in substantially the same way as the text input system according to the first exemplary embodiment except for the operation which is performed as the text input system according to the third exemplary embodiment further includes a text input unit such as the display unit 140 for displaying a screen. Therefore, detailed operations of the text input system according to the third exemplary embodiment will not be provided as they are already described above.

Figure 4:
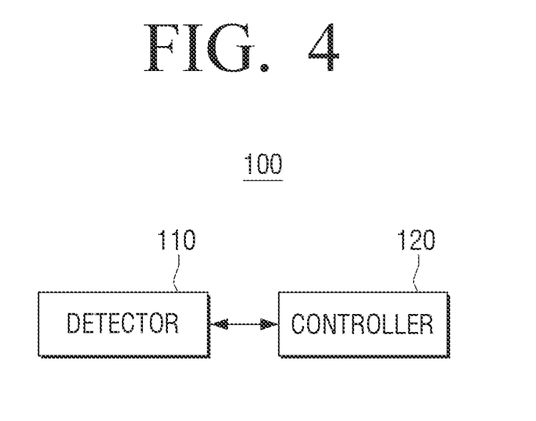
FIG. 4 is a block diagram illustrating a user terminal apparatus according to various exemplary embodiments of the present invention.
Figure 5:
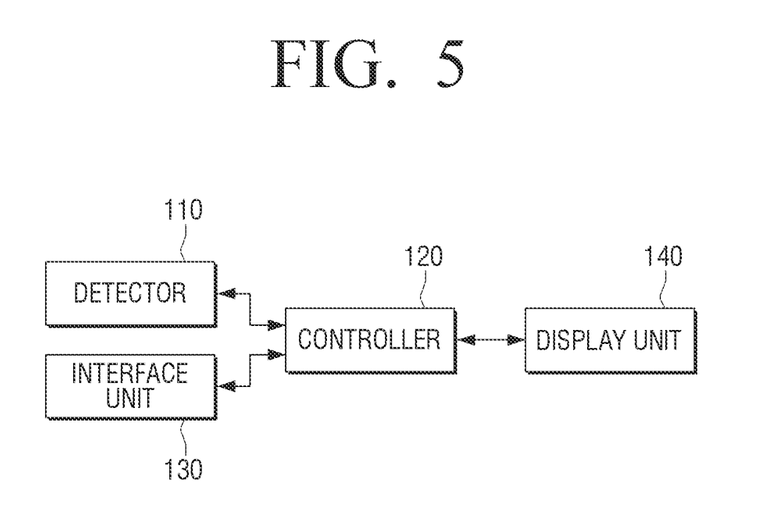
FIG. 5 is a block diagram illustrating a user terminal apparatus according to various exemplary embodiments of the present invention.

FIG. 4 is a block diagram illustrating a user terminal apparatus according to various exemplary embodiments of the present invention. FIG. 5 is a block diagram illustrating a user terminal apparatus according to various exemplary embodiments of the present invention.

Referring to FIGS. 4 and 5, the user terminal apparatus 100 comprises a part of or all of a detector 110, a controller 120, an interface unit 130, and the display unit 140. Herein, the user terminal apparatus 100 according to the first exemplary embodiment may comprise a part of or all of the detector 110, the controller 120, and the interface unit 130. The user terminal apparatus 100 according to the second exemplary embodiment may comprise a part of or all of the detector 110, the controller 120, the interface unit 130, and the display unit 140. The user terminal apparatus 100 according to the third exemplary embodiment may comprise a part of or all of the detector 110, the controller 120, the interface unit 130, the display unit 140, and a text input unit (not shown) performing the function of a keyboard. Hereinafter, the user terminal apparatus 100 according to various exemplary embodiments will be explained in more detail based on the above-mentioned features.

The detector 110 detects a text input mode which is set in the user terminal apparatus 100.

Herein, the text input mode may be a mode to be applied to a text which will be displayed on a text input screen when a text input is performed. The text input mode may include at least one of a language mode (e.g., Korean mode, English mode, Japanese mode, Chinese mode, and so on), a Caps Lock mode, an Insert mode, a Numlock mode, and the like.

Such a text input mode may be set in the user terminal apparatus 100 as a specific area that is selected in the text input apparatus 200 which is connected to the user terminal apparatus 100 via a cable or wirelessly or in a text input unit (not shown) installed in the user terminal apparatus 100.

Alternatively, if the display unit 140 displays a text input means such as a keyboard, a text input mode may be set in the user terminal apparatus 100 as a specific area that is selected in the text input means.

Accordingly, if a text input mode is set in the user terminal apparatus 100, the detector 110 may detect the text input mode set in the user terminal apparatus 100.

The interface unit 130 connects the user terminal apparatus 100 to other external apparatuses. More particularly, the interface unit 130 may receive a signal corresponding to a text input or a signal corresponding to a text input mode from the text input apparatus 200 which is connected via a cable or wirelessly. Herein, the connection via a cable may be performed using a wired cable, and the wireless connection may be performed using Bluetooth, RF or NFC, which may be applied to the user terminal apparatus 100 according to the first or the second exemplary embodiments.

In addition, the interface unit 130 may receive a signal corresponding to a text input or a signal corresponding to a text input mode from an input unit (not shown) which is installed in the user terminal apparatus 100, which may be applied to the user terminal apparatus 100 according to the third exemplary embodiment.

The display unit 140 displays a screen. More particularly, the display unit 140 may display a text input screen including a text input cursor, a sign corresponding to a text input mode, and the like. The display unit 140 may be formed on the user terminal apparatus 100 according to the second and third exemplary embodiments.

In the case of the user terminal apparatus 100 according to the first exemplary embodiment, the function of the display unit 140 may be performed by the display apparatus 300 which is a separate object.

Meanwhile, the display unit 140 and the display apparatus 300 may be realized as one of a liquid crystal display, a thin film transistor-liquid crystal display, an organic light-emitting diode, a flexible display, a 3D display, a transparent display, and the like.

The controller 120 controls overall operations of the user terminal apparatus 100. More specifically, the controller 120 may control all or part of the detector 110, the controller 120, the interface unit 130, and the display unit 140.

More particularly, the controller 120 may generate a sign corresponding to a detected text input mode. Herein, the sign may include at least one of language information, insert on/off information, Numlock on/off information, and the like to be displayed on a text input screen when a text input is performed.

The language information represents information regarding the type of language of a text to be displayed on a text input screen when a text input is performed. For example, if a text to be displayed on the text input screen is 'Korean', the language information may be '가', and if a text to be displayed on the text input screen is 'English', the language information may be 'A' or 'a'. Herein, whether 'English' is an upper case letter or a lower case letter may be different according to whether the Caps Lock mode is set or not. However, this is only an example, and the language information may vary depending on the type of language to be displayed (e.g., Chinese, Japanese, Russian, and so on).

Meanwhile, such language information may be generated as the controller 120 uses the language mode and Caps Lock mode from among detected text input modes.

The insert on/off information means information regarding whether the inserting function will be performed on a text to be displayed on a text input screen when a text input is performed. The insert on/off information may be generated as the controller 120 uses the Insert mode from among detected text input modes.

The Numlock on/off information means information regarding whether the Numlock function will be performed on a text to be displayed on a text input screen when a text input is performed. The Numlock on/off information may be generated as the controller 120 uses the Numlock mode from among detected text input modes.

Accordingly, when a text input is performed, the controller 120 may generate a sign including at least one of language information, insert on/off information, and Numlock on/off information of a text to be displayed on a text input screen.

In addition, the controller 120 may provide the generated sign near a text input cursor. Herein, the text input cursor may be represented as '|' which is displayed on a location where a text will be input.

Meanwhile, the controller 120 may generate a combination cursor by positioning the generated sign near the text input cursor and provide the sign near the text input cursor by providing the generated combination cursor on a location where a text will be input.

In addition, the controller 120 may provide the generated sign near the text input cursor without generating a separate combination cursor.

That is, the operation of providing the sign near the text input cursor may vary depending on how an image processor (not shown) is realized in the controller 120.

Meanwhile, as the controller 120 provides the generated sign near the text input cursor, the display unit 140 or the display apparatus 300 may display the generated sign near the text input cursor.

The controller 120 may control to position the sign on the right, upper or lower side of the text input cursor. Herein, the sign is not positioned on the left since a text will be positioned on the left side of the text input cursor when the text is input. This will be explained in more detail with reference to FIGS. 6A to 7B.

FIGS. 6A to 7B are views illustrating a text input screen according to various exemplary embodiments of the present invention.

Figure 6A:
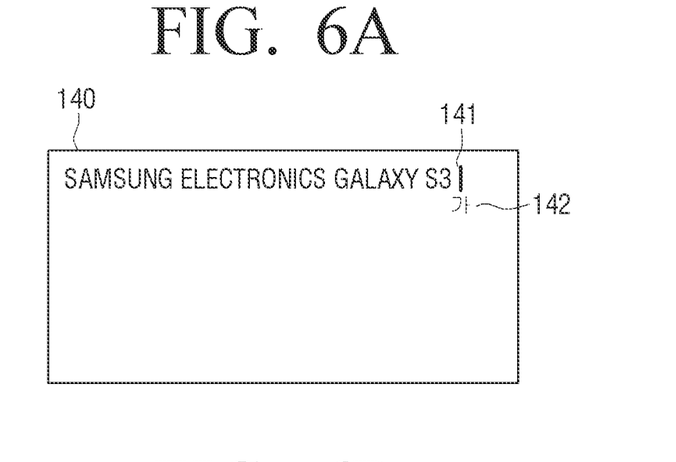
Figure 6B:
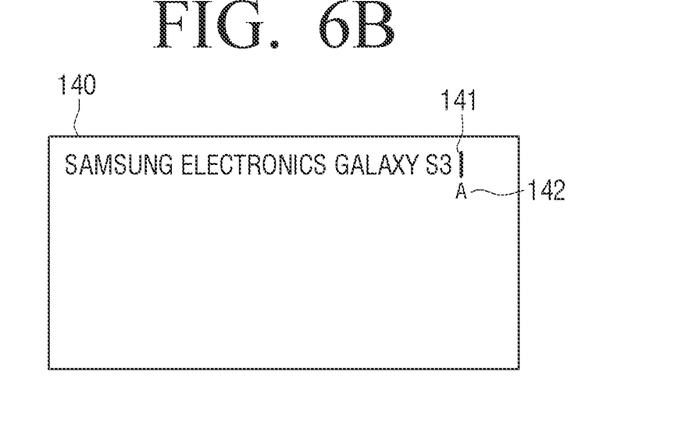

Referring to FIG. 6A, a text input screen displayed on the display unit 140 displays a text input cursor 141, language information '가' 142 displayed near the text input cursor 141, and a text input from a user. Referring to FIG. 6B, a text input screen displayed on the display unit 140 displays the text input cursor 141, language information 'A' 142 displayed near the text input cursor 141, and a text input from a user.

Figure 6C:
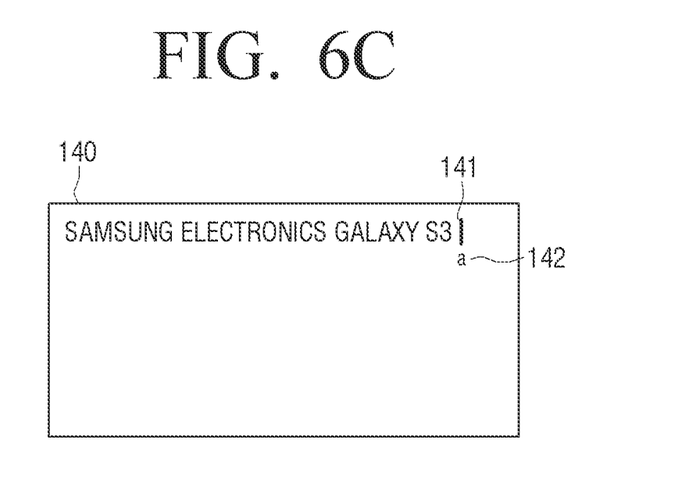

Referring to FIG. 6C, a text input screen displayed on the display unit 140 displays the text input cursor 141, language information 'a' 142 displayed near the text input cursor 141, and a text input from a user. Herein, language information 142 is positioned and displayed on the lower side of the text input cursor 141. Accordingly, a user may easily identify the language type of a text to be input after 'Samsung Electronics Galaxy S3', thus preventing the user from making typographical error.

Meanwhile, in the above description regarding FIGS. 6A and 6B, the language information 142 is positioned on the lower side of the text input cursor 141. However, this is only an example. That is, the language information 142 may be displayed on the right or upper side of the text input cursor 141 according to a user setting.

Figure 7A:
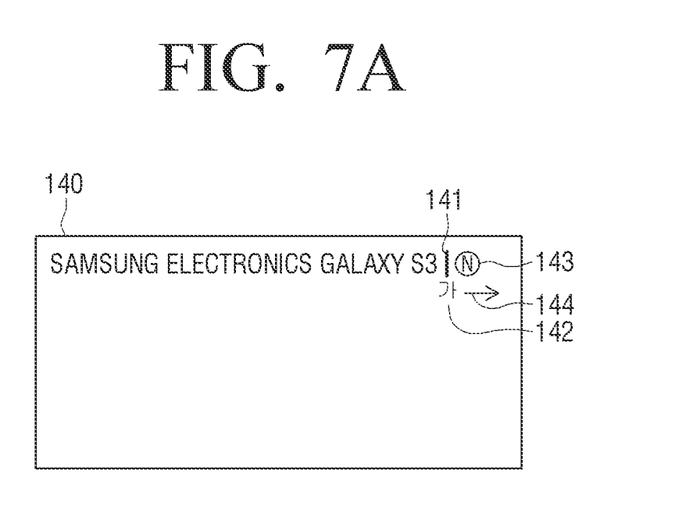
Figure 7B:
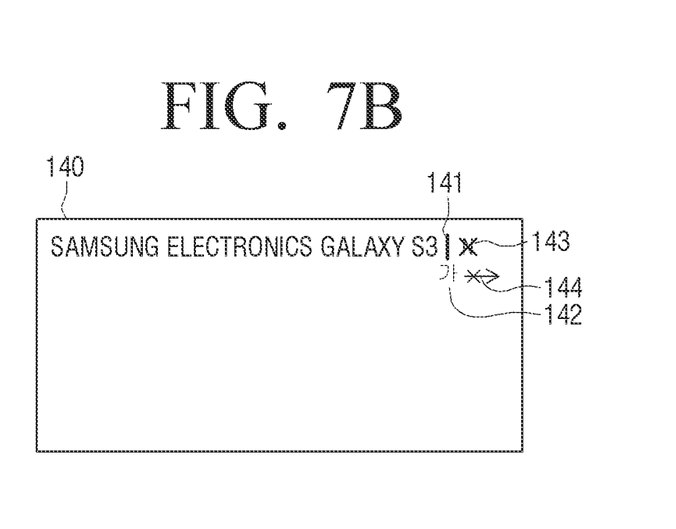

Referring to FIG. 7A, a text input screen displayed on the display unit 140 displays the text input cursor 141, language information '가' 142 displayed near the text input cursor 141, Numlock on information 143, Insert on information 144, and a text input from a user. Referring to FIG. 7B, a text input screen displayed on the display unit 140 displays the text input cursor 141, language information '가' 142 displayed near the text input cursor 141, Numlock on information 143, Insert on information 144, and a text input from a user. Herein, language information 142 is positioned and displayed on the lower side of the text input cursor 141, Numlock on/off information 143 is positioned and displayed on the right side of the text input cursor 141, and Insert on/off information 144 is displayed on the right side of language information '가' 142. Accordingly, a user may easily identify not only the language type of a text to be input after 'Samsung Electronics Galaxy S3' but also whether the inserting function and the Numlock function are set. Therefore, user efficiency in inputting a text may be enhanced.

Meanwhile, in the above description regarding FIGS. 7A and 7B, signs 142, 143, 144 are positioned on a specific area of the text input cursor, but this is only an example. The signs 142, 143, 144 may be located on a different positions from that of FIGS. 7A and 7B. Furthermore, in the exemplary embodiment illustrated in FIG. 7A, the Numlock on/off information 143 is illustrated as an uppercase N within a circle while the Insert on/off information 144 is illustrated as an arrow pointed to the right. These indications correspond to a condition in which the Numlock function is on and the Insert function is on, respectively. On the other hand, FIG. 7B illustrates an embodiment in which the Numlock function is off and the Insert function is off, respectively. That is, the Numlock on/off information 143 is illustrated as uppercase X overlying an uppercase N and the Insert on/off information 144 is illustrated as an arrow pointing to the right underlying an X. Of course, these are merely examples of the Numlock on/off information 143 and Insert on/off information 144.

The controller 120 may change the location of the sign near the text input cursor according to the display state of the text input screen, which will be explained with reference to FIG. 8.

Figure 8:
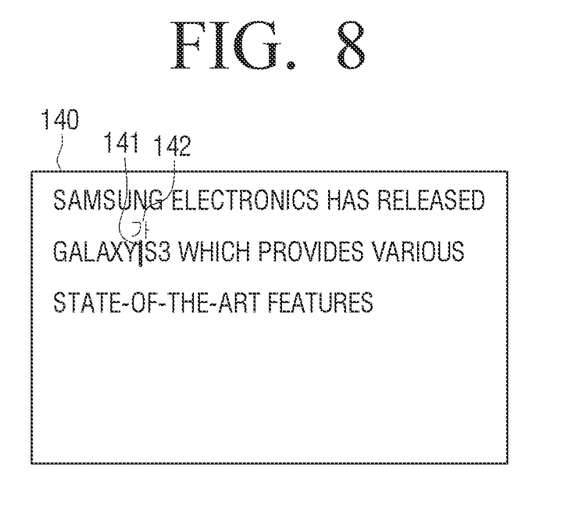

FIG. 8 is a view illustrating a text input screen according to various exemplary embodiments of the present invention.

Referring to FIG. 8, a text input screen displayed on the display unit 140 displays the text input cursor 141, language information '가' 142 displayed near the text input cursor 141, and a text input from a user. In FIG. 8, language information '가' 142 is positioned and displayed on the upper side of the text input cursor 141 since, if language information '가' 142 is positioned at a location where a text is displayed, it may interfere with a user's ability to identify the text. Therefore, the controller 120 may change the location of the sign near the text input cursor 141 according to the display state of the text input screen.

If a text is not input to the user terminal apparatus 100 for a predetermined time interval or a text input mode is changed, a sign may be provided near a text input cursor 141. That is, if a user does not input a text through the input apparatus 200 or a text input unit (not shown) for a predetermined time, the user may not remember the text input mode currently set in the user terminal apparatus 100. Alternatively, if a user selects a text input mode setting area through the input apparatus 200 or the text input unit (not shown) by mistake, the user may not remember the text input mode currently set in the user terminal apparatus 100. Therefore, the controller 120 may provide the sign near the text input cursor 141.

In addition, if a predetermined time elapses, the controller 120 may delete the sign and provide only the text input cursor 141 at a location where a text will be input. More desirably, if a text input is received during a predetermined time from the time when the sign is displayed, the controller 120 deletes the sign after a predetermined time elapses from the time when the text is input and provides only the text input cursor 141 at a location where a text will be input. That is, the fact that a user's text input is performed while the sign is displayed for a predetermined time from the time when the sign is displayed may indicate that the user is performing the text input while recognizing the current text input mode. In this case, if the sign is continuously provided, it may interfere with the user's text input and thus, the controller 120 may delete the sign and provide only the text input cursor 141 at a location where a text will be input.

Meanwhile, according to the above description, the controller 120 may provide the sign near the text input cursor 141. According to the first exemplary embodiment, the display apparatus 300 may display a provided sign, and according to the second exemplary embodiment, the display unit 140 may display the sign.

In the above description regarding FIGS. 4 and 5, the detector 110 is provided as a separate component, but the above-described function of the detector 110 may be performed by the controller 120.

Figure 9:
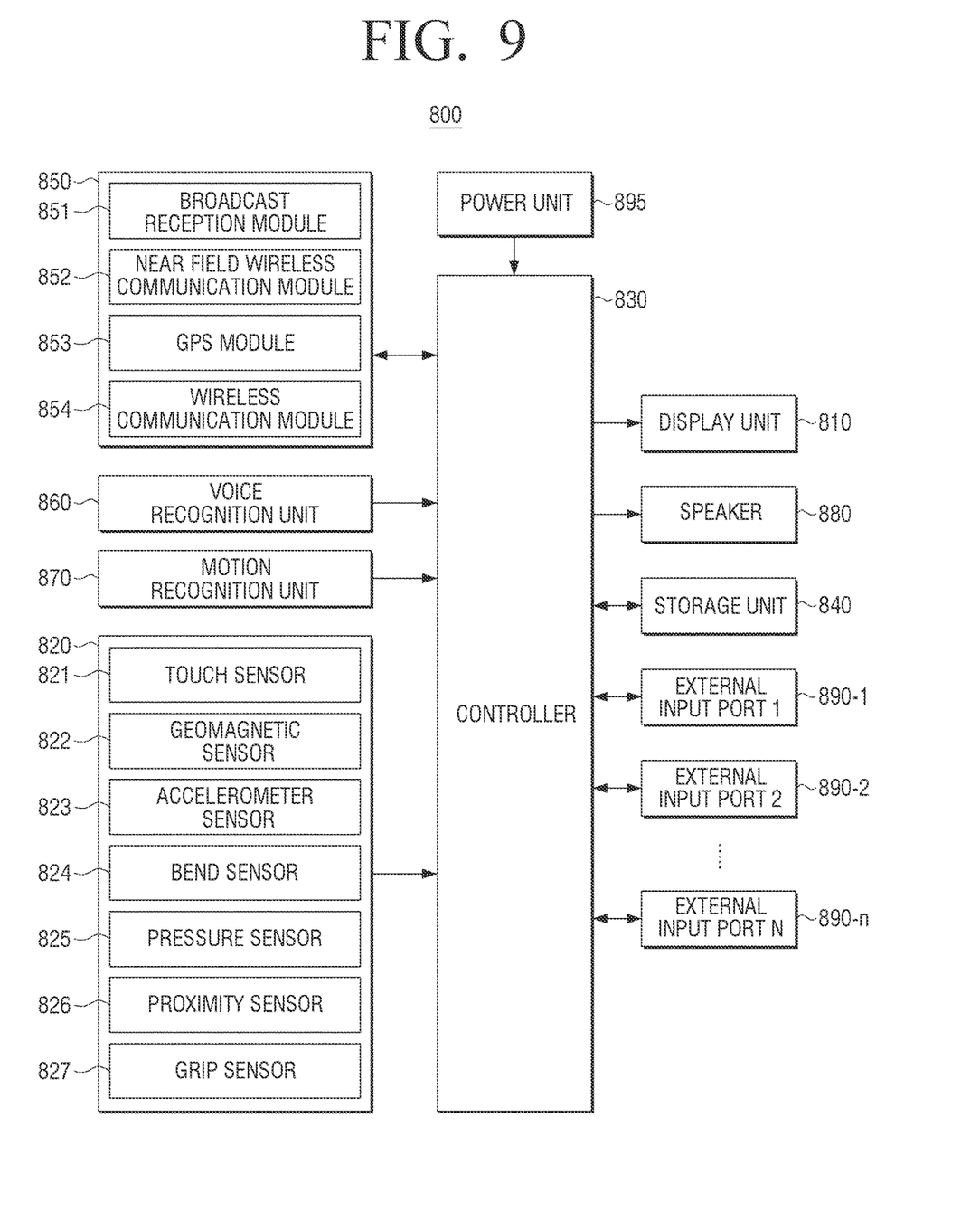
FIG. 9 is a block diagram illustrating a user terminal apparatus according to the second exemplary embodiment of the present invention.

FIG. 9 is a block diagram illustrating a user terminal apparatus according to the second exemplary embodiment of the present invention.

Referring to FIG. 9, a user terminal apparatus 800 comprises a part or all of a display unit 810, a sensor 820, a controller 830, a storage unit 840, a communication unit 850, a voice recognition unit 860, a motion recognition unit 870, a speaker 880, external input ports 890-1~890-n, and a power unit 895. A description of the components in FIG. 9 which have been already described above will not be provided.

The sensor 820 senses various states necessary for operations of the user terminal apparatus 800. The sensor 820 may comprise a part or all of various sensors such as a touch sensor 821, a geomagnetic sensor 822, an accelerometer sensor 823, a bend sensor 824, a pressure sensor 825, a proximity sensor 826, and a grip sensor 827.

The touch sensor 821 may be realized as capacitive or resistive sensor. The capacitive sensor determines the coordinates of a touch by sensing micro-electricity excited by a user body when part of the user's body touches the surface of the display unit 810 using a dielectric coated on the surface of the display unit 810. The resistive sensor comprises two electrode plates, and determines the coordinates of a touch as the upper and lower plates of the touched point contact with each other to sense flowing electric current when a user touches a screen. As such, the touch sensor 821 may be realized in various forms.

The geomagnetic sensor 822 is a sensor to sense a rotation state and a motion direction of the user terminal apparatus 800, and the accelerometer sensor 823 is a sensor to sense the degree of tilt of the user terminal apparatus 800. As described above, the geomagnetic sensor 822 and the accelerometer sensor 823 may be used not only to detect bending characteristics such as a bending direction and a bending area of the user terminal apparatus 800, respectively, but also to detect a rotation state or the degree of tilt of the user terminal apparatus 800.

The bend sensor 824 is required when the user terminal apparatus 800 is realized as a flexible display apparatus, and may sense a bending state of the user terminal apparatus 800.

The pressure sensor 825 senses the magnitude of pressure applied on the user terminal apparatus 800 when a user performs a touch or a bending manipulation and provides the result to the controller 830. The pressure sensor 825 may include a piezo film which is mounted inside the display unit 810 and outputs an electric signal corresponding to the magnitude of the pressure. In FIG. 9, the pressure sensor 825 is illustrated as a component separate from the touch sensor 821, but if the touch sensor 821 is realized as a resistive touch sensor, the resistive touch sensor may serve as the pressure sensor 825 as well.

The proximity sensor 826 is a sensor to sense a motion which is approaching but not directly contacting a display surface. The proximity sensor 826 may be realized as various types of sensors such as a high-frequency oscillation-type proximity sensor, which forms a high-frequency magnetic field and senses an electric current induced by the characteristics of the magnetic field, a magnetic proximity sensor, which uses a magnet, and a capacitive proximity sensor, which senses changing capacity as an object approaches.

The grip sensor 827, which is separate from the pressure sensor 825, is positioned on the edge or the handle of the user terminal apparatus 800 and senses the grip of a user. The grip sensor 827 may be realized as a pressure sensor or a touch sensor.

The controller 830 analyzes various sensing signals sensed by the sensor 820, identifies a user intention, and performs an operation accordingly. For example, the controller 830 may process data obtained through communication with an external apparatus or data stored in the storage unit 840 and outputs the processed data through the display unit 810, the speaker 880, and so on. In this case, the controller 830 may perform communication with an external apparatus using the communication unit 850.

The communication unit 850 performs communication with various types of external apparatuses according to various types of communication methods. The communication unit 850 may comprise any or all of a broadcast reception module 851, a near field wireless communication module 852, a Global Positioning System (GPS) module 863, and a wireless communication module 854. Herein, the broadcast reception module 851 may include a terrestrial broadcast reception module (not shown) including an antenna, a demodulator, an equalizer, etc. and a Digital Multimedia Broadcast (DMB) module to receive and process a DMB broadcast signal. The near field wireless communication module 852 refers to a module which performs communication with a nearby external apparatus according to a near field wireless communication method such as NFC, Bluetooth, and Zigbee. The GPS module 853 refers to a module to detect the current location of the user terminal apparatus 800 by receiving a GPS signal from a GPS satellite. The wireless communication module 854 refers to a module which performs communication by being connected to an external network according to a wireless communication protocol such as those defined by the WiFi or Institute of Electrical and Electronics Engineers (IEEE) standards. In addition, the communication module 852 may further include a mobile communication module which performs communication by being connected to a mobile communication network according to various mobile communication standards such as 3rd Generation (3G), 3rd Generation Partnership Project (3GPP), and Long Term Evolution (LTE).

The controller 830 may perform operations by selectively activating components necessary to perform operations intended by a user from among each component of the communication unit 850.

Meanwhile, the controller 830 may recognize a voice input or a motion input in addition to a bending manipulation or a touch manipulation, and perform an operation corresponding to the input. In this case, the voice recognition unit 860 or the motion recognition unit 870 may be activated.

The voice recognition unit 860 collects a user voice or an external sound using a voice collecting means such as a microphone (not shown) and transmits the collected data to the controller 830. In a voice control mode, if a user's voice is consistent with a predetermined voice command, the controller 830 may perform a task corresponding to the user's voice. There are various tasks that can be performed using a voice such as volume control, channel selection, channel zapping, displaying property control, reproduction, pause, rewind, fast-forward, application execution, menu selection, turn on/off of apparatus, and the like.

Meanwhile, the motion recognition unit 870 obtains a user image using an image photographing means (not shown) such as a camera and provides the obtained data to the controller 830. In a motion control mode, if the controller 830 analyzes a user image and it is determined that a user takes a motion gesture corresponding to a predetermined motion command, the controller 830 performs an operation corresponding to the motion gesture. There are various tasks that can be performed using a motion gesture such as channel zapping, turn on/off of apparatus, pause, reproduction, stop, rewind, fast-forward, mute, and the like. The above exemplary tasks that can be controlled by a voice or a motion are only examples and are not limited thereto.

In addition, the external input ports 1, 2~n (890-1~890-n) may be connected to each of various types of external apparatuses and receive various data, programs, controls commands, and so on. More specifically, the external input ports may include a Universal Serial Bus (USB) port, a headset port, a mouse port, a Local Area Network (LAN) port, and so on.

The power unit 895 provides power to each component of the user terminal apparatus 800.

Meanwhile, in FIG. 9, the communication unit 850 and the external input ports 890-1~890-n may perform the function of the interface unit 130.

Figure 10:
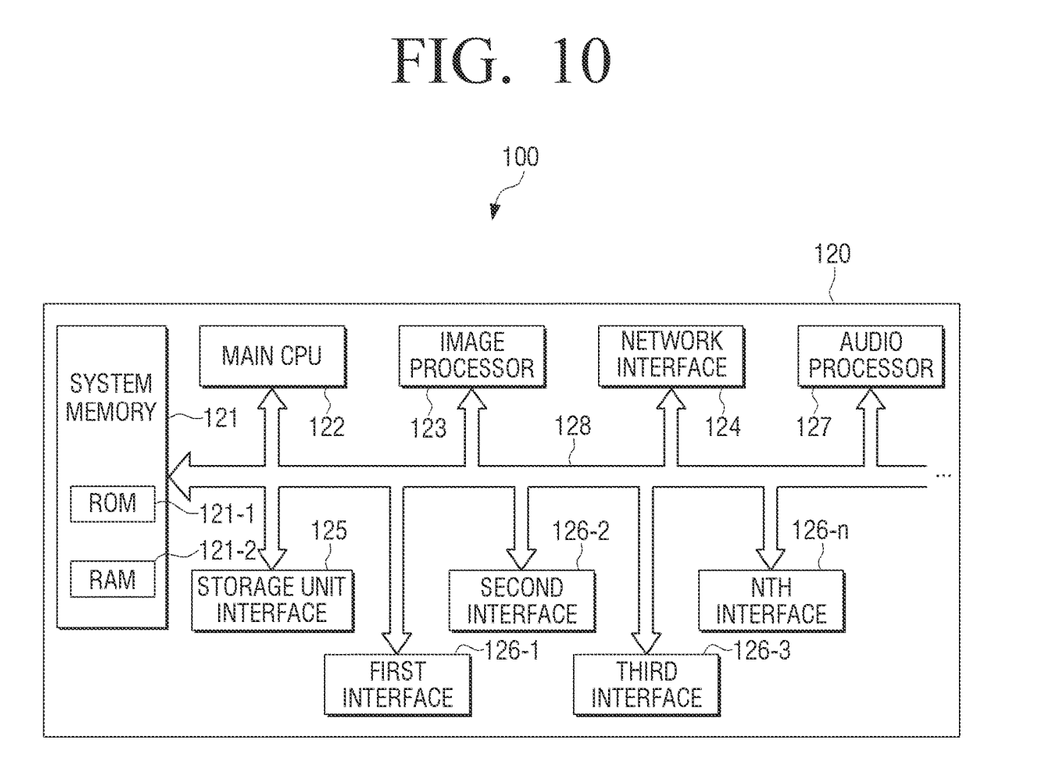
FIG. 10 is a block diagram illustrating a controller according to various exemplary embodiments of the present invention.

FIG. 10 is a block diagram illustrating a controller according to various exemplary embodiments of the present invention.

According to FIG. 10, the controller 120 comprises a system memory 121, a main CPU 122, an image processor 123, network interface 124, a storage unit interface 125, a first to nth interface 126-1~126-n, an audio processor 127, and a system bus 128.

The system memory 121, the main CPU 122, the image processor 123, the network interface 124, the storage unit interface 125, the first to the nth interface 126-1~126-n, and the audio processor 127 may be connected to one another through the system bus 128 and may transmit/receive various data and signals.

At least one of the first to nth interface 126-1~126-n supports interfacing between various components within the user terminal apparatus 100 such as the sensor 820 and each component within the controller 120. In addition, at least one of the first to nth interface 126-1~126-n may receive various signals from an external apparatus connected through the external input ports 890-1~890-n of the user terminal apparatus 100. Herein, the first to nth interface 126-1~126-n may perform the function of the interface unit 130.

The system memory 121 comprises a Read Only Memory (ROM) 121-1 and a Random Access Memory (RAM) 121-2. The ROM 121-1 stores a set of commands for system booting. If a turn-on command is input and power is supplied, the main CPU 122 copies an Operating System (0/S) stored in a storage unit (not shown) according to the command stored in the ROM 121-1 and executes the O/S to boot the system. If the booting is completed, the main CPU 122 copies various application programs stored in the storage unit on the RAM 121-2 and executes the various programs copied on the RAM 121-2 to perform various operations. Accordingly, a document writing program such as a Word program may be performed.

Meanwhile, the RAM may store a text input mode set in the user terminal apparatus 100. Accordingly, the detector 110 may detect a text input mode set in the user terminal apparatus 100.

As described above, the main CPU 122 may perform various operations according to the execution of application programs stored in the storage unit.

The storage unit interface 125 is connected to the storage unit and transmits/receives various programs, contents, data, and so on.

The image processor 123 may include a decoder, a renderer, a scaler, and so on. Accordingly, a frame may be composed by decoding stored contents and rendering the decoded contents data, and the size of the composed frame may be scaled to fit the screen size of the display unit 140 or the display apparatus 300. The image processor 123 provides the processed frame to the display unit 110 or the display apparatus 300. Accordingly, the display unit 110 or the display apparatus 300 may display a text input screen including a text input cursor, a sign, and a text input from a user.

The audio processor 127 refers to a component which processes audio data and provides the processed audio to an audio output means such as a speaker.

The network interface 124 is connected to external apparatuses via a network. For example, if a web browser program is executed, the main CPU 122 accesses a web server through the network interface 124. If web page data is received from the web server, the main CPU 122 controls the image processor 123 to compose a web page and displays the composed web page screen on the display unit 110 or the display apparatus 300.

Figure 11:
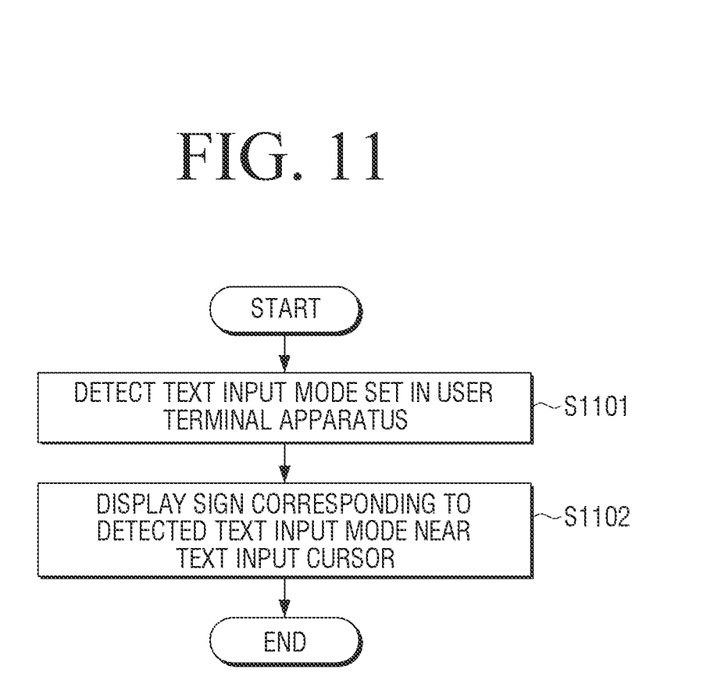
FIG. 11 is a flowchart illustrating a method for inputting a text according to various exemplary embodiments of the present invention.

FIG. 11 is a flowchart illustrating a method for inputting a text according to an exemplary embodiment of the present invention.

Referring to FIG. 11, first of all, a text input mode set in a user terminal apparatus is detected at step S1101.

Herein, the text input mode may be a mode to be applied to a text which will be displayed on a text input screen when a text input is performed.

In addition, the text input mode may be set on a user terminal apparatus as a specific area is selected in a text input apparatus which is connected to the user terminal apparatus via cable or wirelessly.

Subsequently, a sign corresponding to the detected text input mode is displayed near a text input cursor at step S1102.

Herein, the sign may further include language information of a text to be displayed on a text input screen when a text input is performed. In addition, the sign may further include at least one of insert on/off information and Numlock on/off information.

The displaying at step S1102 may comprise displaying a sign near a text input cursor when a text input regarding a user terminal apparatus is not received for a predetermined time interval or a text input mode is changed.

In addition, the displaying at step S1102 may comprise changing the location of a sign and displaying the sign near a text input cursor according to a display state of a text input screen.

A method for inputting a text according to an exemplary embodiment may further include deleting a sign and displaying only a text input cursor on a location where a text will be input if a predetermined time elapses from a time when the sign is displayed.

In addition, a method for inputting a text according to an exemplary embodiment may further comprise receiving a text input regarding a user terminal apparatus.

The displaying at step S1101 may comprise displaying a sign near a text input cursor in various ways. For example, a combination cursor may be generated by positioning a sign near a text input cursor and providing the sign near the text input cursor by providing the generated combination cursor on a location where a text will be input.

In addition, a sign may be displayed near a text input cursor as the generated sign is positioned near the text input cursor without generating a separate combination cursor.

That is, the operation of displaying the sign near the text input cursor may vary depending on how an image processor 123 is realized in the controller 120.

Meanwhile, a method for inputting a text in a user terminal apparatus according to the above-described various exemplary embodiments may be realized as a program code and stored in a non-transitory computer readable medium, and then provided to each server or devices.

Herein, the non-transitory recordable medium refers to a medium which may store data semi-permanently rather than storing data for a short time such as a register, a cache, and a memory and may be readable by an apparatus. More specifically, the above-mentioned various applications or programs may be stored in a non-temporal recordable medium such as a Compact Disc (CD), a Digital Video Disc (DVD), a hard disk, a Blu-ray disk, a USB enabled device, a memory card, and a ROM, and provided therein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for inputting a text in a user terminal apparatus, the method comprising:
   identifying a text input mode of the user terminal apparatus;
   displaying a sign corresponding to the identified text input mode at a first predetermined location near a text input cursor based on a position in which input text is displayed;
   displaying additional input text;
   changing, based on a display state of a text input screen, in which the additional input text is displayed, a placement of the sign corresponding to the identified text input mode from the first predetermined location with respect to the text input cursor to a second predetermined location with respect to the text input cursor different from the first predetermined location based on a position in which the additional input text is displayed, an orientation of the sign with respect to the cursor being changed when the placement of the sign is changed from the first predetermined location to the second predetermined location, and
   based on a predetermined time elapsing after the sign is displayed while inputting of the text is kept, deleting the sign and displaying only the text input cursor on a location where a text is to be input, wherein the display state is a state in which the sign interferes with identification of the text displayed in the text input screen, wherein the sign comprises insert on/off information, Numlock on/off information and language information regarding the text to be displayed on the text input screen, and wherein the displaying of the sign comprises, based on a text input to the user terminal apparatus not being received for a predetermined time or the text input mode being changed, displaying the sign near the text input cursor.

2. The method as claimed in claim 1, wherein the text input mode is a mode to be applied to a text to be displayed on the text input screen when a text input is performed.

3. The method as claimed in claim 1, further comprising:
obtaining a combination cursor by positioning the sign near the text input cursor, wherein the displaying of the sign at the changed location comprises displaying the sign near the text input cursor by displaying the obtained combination cursor on a location where a text is to be input.

4. The method as claimed in claim 1, further comprising:
receiving a text input, wherein the user terminal apparatus is a smart phone, and wherein the text input is performed through a text input apparatus which is connected to the user terminal apparatus via a cable or wirelessly.

5. The method as claimed in claim 1, wherein the text input mode is set in the user terminal apparatus as a specific area and is selected in a text input apparatus which is connected to the user terminal apparatus via a cable or wirelessly.

6. A user terminal apparatus, the user terminal apparatus comprising:
a detector; and
at least one processor configured to:
control the detector to identify a text input mode of the user terminal apparatus,
provide a sign corresponding to the identified text input mode at a first predetermined location near a text input cursor based on a position in which input text is displayed,
display additional input text, and
change, based on a display state of a text input screen, in which the additional input text is displayed, a placement of the sign corresponding to the identified text input mode from the first predetermined location with respect to the text input cursor to a second predetermined location with respect to the text input cursor different from the first predetermined location based on a position in which additional input text is displayed, wherein an orientation of the sign with respect to the cursor is changed when the placement of the sign is changed from the first predetermined location to the second predetermined location, and wherein the at least one processor is further configured to, based on a predetermined time elapsing after the sign is displayed while inputting of the text is kept, delete the sign and display only the text input cursor on a location where a text is to be input, wherein the at least one processor, based on a text input to the user terminal apparatus not being received for a predetermined time or the text input mode being changed, is further configured to provide the sign near the text input cursor, wherein the display state is a state in which the sign interferes with identification of the text displayed in the text input screen, and wherein the sign comprises insert on/off information, Numlock on/off information and language information regarding the text to be displayed on the text input screen.

7. The apparatus as claimed in claim 6, wherein the text input mode is a mode to be applied to a text to be displayed on the text input screen when a text input is performed.

8. The apparatus as claimed in claim 6, wherein the at least one processor is further configured to:
obtain a combination cursor by positioning the sign near the text input cursor, and
provide the sign near the text input cursor by providing the obtained combination cursor on a location where a text is to be input.

9. The apparatus as claimed in claim 6, further comprising:
a display configured to display a screen,
wherein the at least one processor is further configured to control the display to display the sign corresponding to the identified text input mode near the text input cursor.

10. The apparatus as claimed in claim 9, further comprising:
external input ports configured to receive a text input,
wherein the user terminal apparatus is a smart phone, and
wherein the text input is performed through a text input apparatus which is connected through the external input ports via cable or wirelessly.

11. A non-transitory computer-readable recording medium having recorded thereon a program code for performing the method of claim 1.

* * * * *